United States Patent [19]

Okamoto et al.

[11] 4,276,605
[45] Jun. 30, 1981

[54] METHOD AND APPARATUS FOR SUPERVISING A DIGITAL PROTECTIVE RELAYING SYSTEM

[75] Inventors: Eiichi Okamoto, Tokyo; Norio Fujisawa, Fuchu; Masao Hori, Yokohama, all of Japan

[73] Assignee: Tokyo Shibaura Denki Kabushiki Kaisha, Kanagawa, Japan

[21] Appl. No.: 29,939

[22] Filed: Apr. 13, 1979

[30] Foreign Application Priority Data

Apr. 18, 1978 [JP] Japan .................................. 53-44767

[51] Int. Cl.³ .............................................. H02H 3/36
[52] U.S. Cl. .................................... 364/483; 364/481; 324/51; 361/86
[58] Field of Search ............... 364/481, 483, 492, 487; 361/80, 86, 91; 324/51, 52, 107

[56] References Cited

U.S. PATENT DOCUMENTS

| | | | |
|---|---|---|---|
| 3,569,785 | 3/1971 | Durbeck et al. | 364/483 |
| 3,758,763 | 9/1973 | Nohara et al. | 364/487 |
| 3,885,199 | 5/1975 | Nohara et al. | 364/481 |
| 3,931,502 | 1/1976 | Kohlas | 364/481 |
| 3,972,470 | 8/1976 | Takagi | 364/483 |
| 3,984,737 | 10/1976 | Okamura et al. | 364/483 |
| 4,107,778 | 8/1978 | Nii et al. | 364/483 |
| 4,148,087 | 4/1979 | Phadke | 324/52 |

FOREIGN PATENT DOCUMENTS 47-41714 12/1972 Japan .

Primary Examiner—Charles E. Atkinson
Assistant Examiner—Gary Chin
Attorney, Agent, or Firm—Stevens, Davis, Miller & Mosher

[57] ABSTRACT

In a method and apparatus for supervising a digital protective relaying system, a first type of electrical quantities in an electric power system, each having a certain magnitude, are detected, digitized and operated on in a data processing unit to check whether there is a fault in any of first input circuits adapted to receive the first type of electrical quantities. To check whether there is a fault in a second input circuit which normally receives a second type of detected electrical quantity having a substantially zero magnitude, one of the first type of electrical quantities is inputted into the second input circuit, and the data processing unit performs an operation on the output of the second input circuit and the outputs of the first input circuits except for that first input circuit corresponding to the one of the first type of electrical quantities which is inputted to the second input circuit.

10 Claims, 14 Drawing Figures

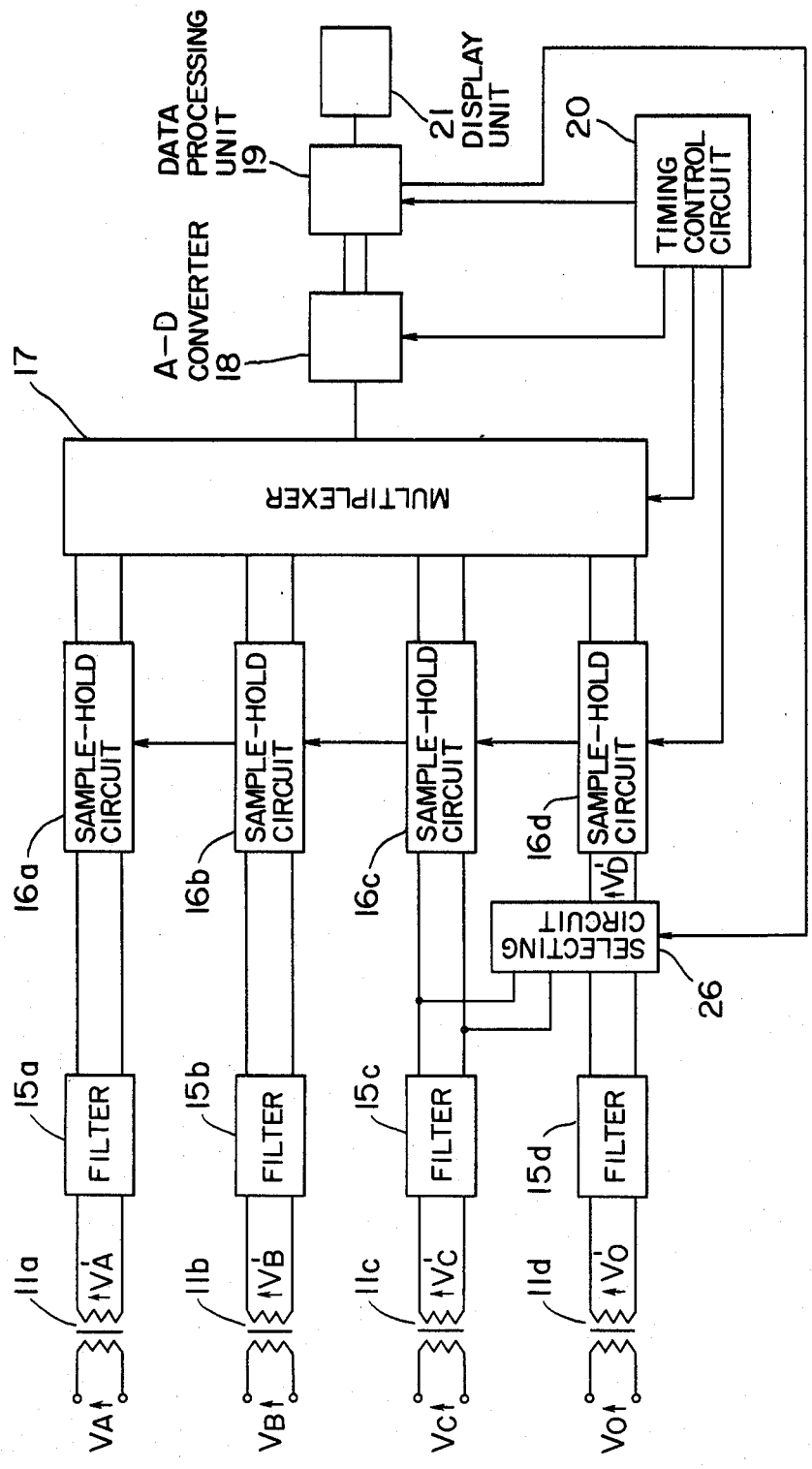

METHOD AND APPARATUS FOR SUPERVISING A DIGITAL PROTECTIVE RELAYING SYSTEM

BACKGROUND OF THE INVENTION

The present invention relates to a method and apparatus for supervising a digital protective relaying system wherein electrical quantities in an electric power system are detected, digitized and operated on for use in protection of the electric power system.

FIG. 1 shows an example of conventional supervising apparatus for use in a protective relaying system. An electrical quantity, such as a voltage, in an electric power system is applied to the primary of the transformer 11 and is converted to a voltage signal $V_1'$. Normally, a contact $12_a$ of an auxiliary relay is open and a contact $12_b$ of the auxiliary relay is closed, and the voltage signal $V_1'$ is fed to a judging circuit 13 where judgement for protection is made. To check whether there is a fault in the judging circuit 13, the contact $12_b$ is opened and the contact $12_a$ is closed, and a test voltage signal $V_2$ supplied from a special power source or derived from the power system is applied to the judging circuit. By varying the magnitude of the test voltage signal $V_2$, one can check at which level the judging circuit operates.

Recently, power systems have become huge and complicated, so that protective relaying systems are required to have improved reliability in order to maintain the stability of the power system. Digital computers are now in use for the purposes of improving the performance, the efficiency and the reliability of the control and the measurement of the power system. In view of the above, digital protective relaying systems have been developed wherein electrical quantities in the power system are digitized, and the data coded in digital form are processed in a mini-computer or a micro-computer to perform digital judgement. In general, the phase currents, the zero-phase current, the phase voltages and the zero-phase voltage are all introduced into the computer in order that a variety of protective functions are afforded by the protective relaying system. However, to introduce all the electrical quantities listed above, the device, like the one shown in FIG. 1, for applying a test voltage signal needs to be provided for each of the detected electrical quantities. As a result, the construction becomes complicated.

SUMMARY OF THE INVENTION

An object of the invention is to provide a method and apparatus for supervising a digital protective relaying system which has a simple construction and is highly reliable.

According to one aspect of the invention, there is provided a method for supervising a digital protective relaying system wherein a first type of electrical quantities in the electric power system, each having a certain magnitude, are detected by detecting means and digitized by respective first input circuits and a second type of electrical quantity in the electric power system which is normally substantially zero is detected by detecting means and digitized by a second input circuit, and the outputs of said first input circuits are arithmetically operated on in a data processing unit to check whether there is a fault in the first input circuits, the improvement which comprises: inputting, into the second input circuit, one of said first type of electrical quantities in place of said second type of electrical quantity, and performing an arithmetical operation in the data processing unit on the output of said second input circuit and the outputs of said first input circuits except for that one of said first input circuits which normally receives said one of said first type of electrical quantities to check whether there is a fault in said second input circuit.

According to another aspect of the invention, there is provided apparatus for supervising a digital protective relaying system wherein a first type of electrical quantities in the electric power system, each having a certain magnitude, are detected by detecting means and digitized by respective ones of first input circuits and a second type of electrical quantity in the electric power system which is normally substantially zero is detected by detecting means and digitized by a second input circuit, and the outputs of said first input circuits are arithmetically operated on in a data processing unit to check whether there is a fault in the first input circuits, the improvement which comprises: selecting means for selectively connecting to said second input circuit said second type of electrical quantity that is normally substantially zero or one of said first type of electrical quantities, and wherein said data processing unit is adapted to perform an arithmetical operation on the output of said second input circuit and the outputs of said first input circuits except that one of said first input circuits which normally receives said one of said first type of electrical quantities to check whether there is a fault in said second input circuit.

BRIEF DESCRIPTION OF THE DRAWINGS

FIGS. 6 and 7 are circuit diagrams showing futher embodiments of a supervising apparatus according to the invention;

DETAILED DESCRIPTION OF THE EMBODIMENTS

Figure 2:
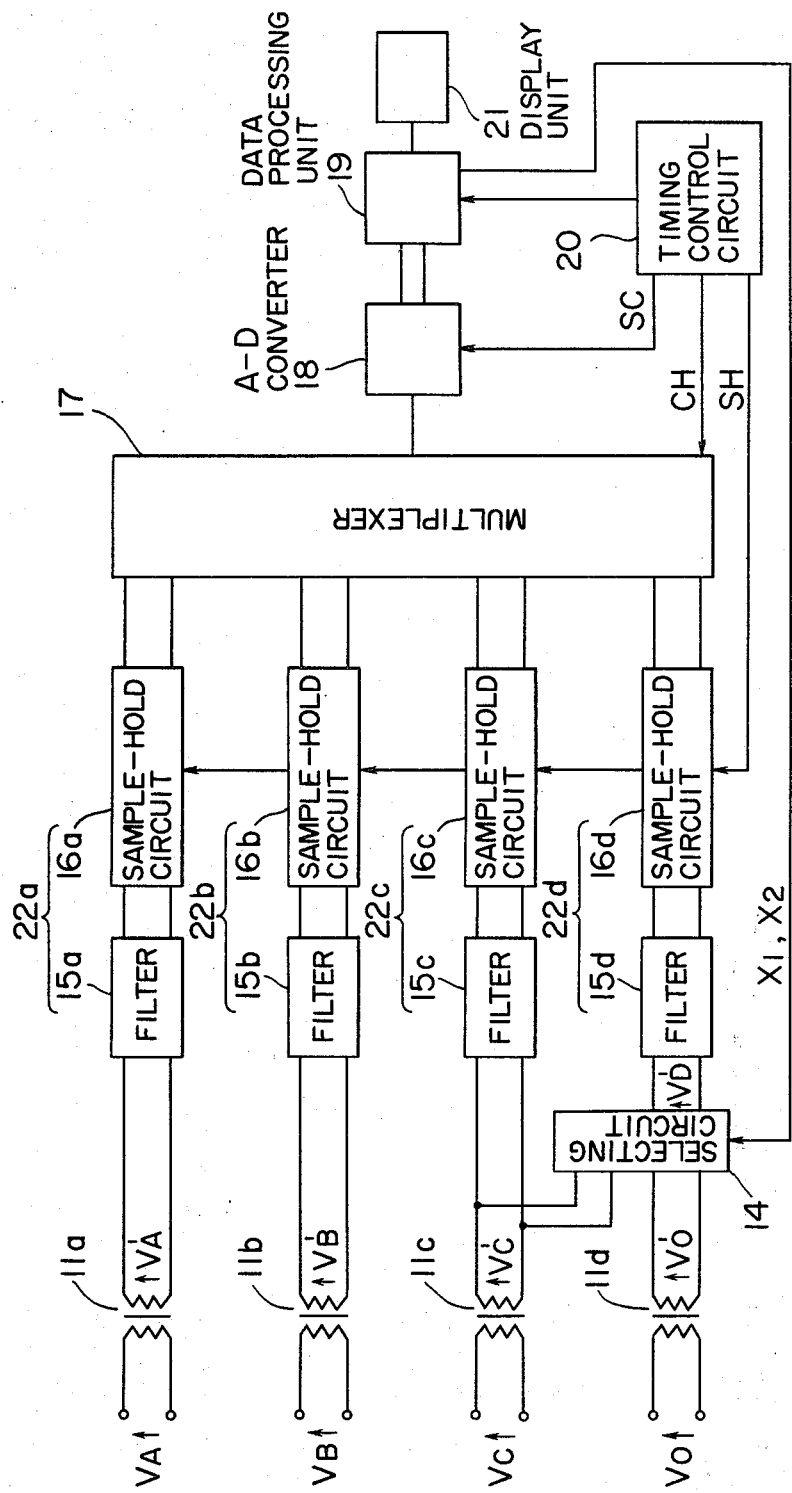
FIG. 2 is a circuit diagram showing an embodiment of a supervising apparatus according to the invention.

FIG. 2 shows an embodiment of supervising apparatus incorporated in a digital protective relaying system. As input electrical quantities, line voltages $V_A (=V_{RS})$, $V_B (=V_{ST})$ and $V_C (=V_{TR})$, and the zero-phase voltage $V_0$ are detected. Input transformers $11_a$, $11_b$, $11_c$ and $11_d$ convert the detected voltages $V_A$, $V_B$, $V_C$ and $V_0$ to voltages $V_A'$, $V_B'$, $V_C'$ and $V_0'$ of a level suitable for the relaying system.

Figure 1:
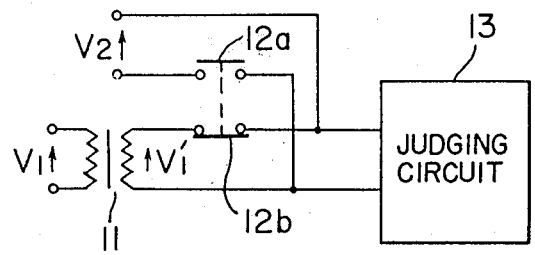
FIG. 1 is a circuit diagram showing an example of a conventional supervising apparatus.
Figure 3:
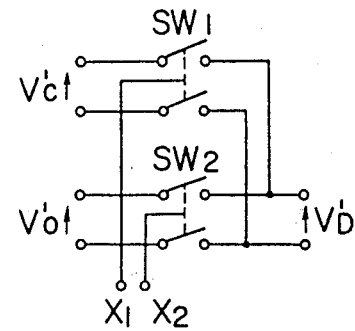
FIG. 3 is a circuit diagram showing an example of a selecting circuit in the supervising apparatus shown in FIG. 2.

A first selecting circuit 14 selectively passes to the output terminal thereof the voltage $V_0'$ or the voltage $V_C'$. The output voltage of the first selecting circuit 14 is designated as $V_D'$. A specific example of the selecting circuit 14 is shown in FIG. 3. More particularly, control signals $X_1$ and $X_2$ have opposite binary states, i.e., when one of them is "1" the other "0". When the control signal $X_1$ is "1", a switch $SW_1$ is closed so that $V_D'$ equals $V_C'$. When the control signal $X_2$ is "1", a switch $SW_2$ is closed so that $V_D'$ equals $V_0'$.

Filters $15_a$, $15_b$, $15_c$ and $15_d$ suppress harmonics in the voltages $V_A'$, $V_B'$, $V_C'$ and $V_D'$.

Figure 4A:
FIGS. 4A through 4D are timing charts showing the timing of operation of the apparatus shown in FIG. 2.
Figure 4B:
Figure 4C:
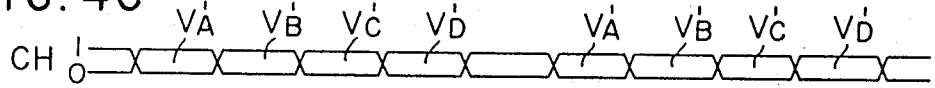

Sample-hold circuits $16_a$, $16_b$, $16_c$ and $16_d$ simultaneously sample at regular intervals the outputs of the filters $15_a$, $15_b$, $15_c$ and $15_d$ and hold the sampled data. The outputs of the sample-hold circuits $16_a$, $16_b$, $16_c$ and $16_d$ are fed to a multiplexer 17 which connects the input signals sequentially, e.g., in the order of $V_A'$, $V_B'$, $V_C'$ and $V_D'$ to the output terminal thereof. The output of the multiplexer 17 is fed to an analog-to-digital converter (A-D converter) 18 where the multiplexed analog signal is converted to a multiplexed digital signal. The multiplexed digital signal is then inputted to a data processing unit 19. The data processing unit 19 selectively takes up the necessary data and performs a pre-scheduled operation on the selected data. The timing of the operations of the sample-hold circuits $15_a$, $15_b$, $15_c$ and $15_d$, the multiplexer 17, the A-D converter 18 and the data processing unit 19 are controlled by a timing control circuit 20, which supplies a sample-hold signal SH, a start-conversion signal SC and a channel selecting signal CH. The sample-hold circuits sample data when the sample-hold signal SH is "0" and hold the data as long as the sample-hold signal SH remains a "1" (FIG. 4A). The A-D converter starts the A-D conversion when the start-conversion signal SC changes from "1" to "0" (FIG. 4B). The multiplexer receives the channel selecting signal CH and serially transmits the outputs of the input circuits $22_a$, $22_b$, $22_c$ and $22_d$ (FIG. 4C) to the A-D converter.

The data processing unit 19 performs not only arithmetical operations for digital protection of the power system, in other words, for checking whether there is a fault in the power system, but also an arithmetical operation for supervising the protective relaying system.

Figure 4D:
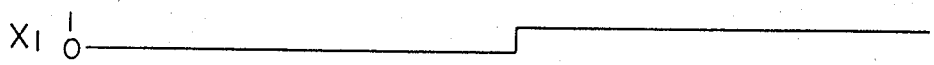

Normally, the control signal $X_1$ is "0" (FIG. 4D) and the input circuits $22_a$, $22_b$ and $22_c$ are tested. The operation for the test may comprise calculation to obtain the absolute value of the sum of the three-phase voltages passed through the respective input circuits, i.e.:

$$|V_A + V_B + V_C|$$

The resultant absolute value is compared with a positive real number $\epsilon$. In the normal state, $|V_A + V_B + V_C|$ equals substantially zero, and $\epsilon$ is selected to be a value which normally satisfies the following relation:

$$|V_A + V_B + V_C| < \epsilon \qquad (1)$$

If there is no fault in any of the input circuits $22_a$, $22_b$ and $22_c$, the relation (1) is satisfied.

If the relation (1) is not satisfied, it may be immediately judged that there is a fault in either of the input circuits $22_a$, $22_b$ and $22_c$. It is however more practical in many cases to repeat the calculation and the comparison, and to make judgement from a plurality of results of several consecutive operations. For example, it may be judged that there is a fault, when several consecutive operations all show that the relation (1) is not satisfied.

When it is judged that there is a fault, the data processing unit 19 actuates a display unit 21 to give a warning.

Figure 5:
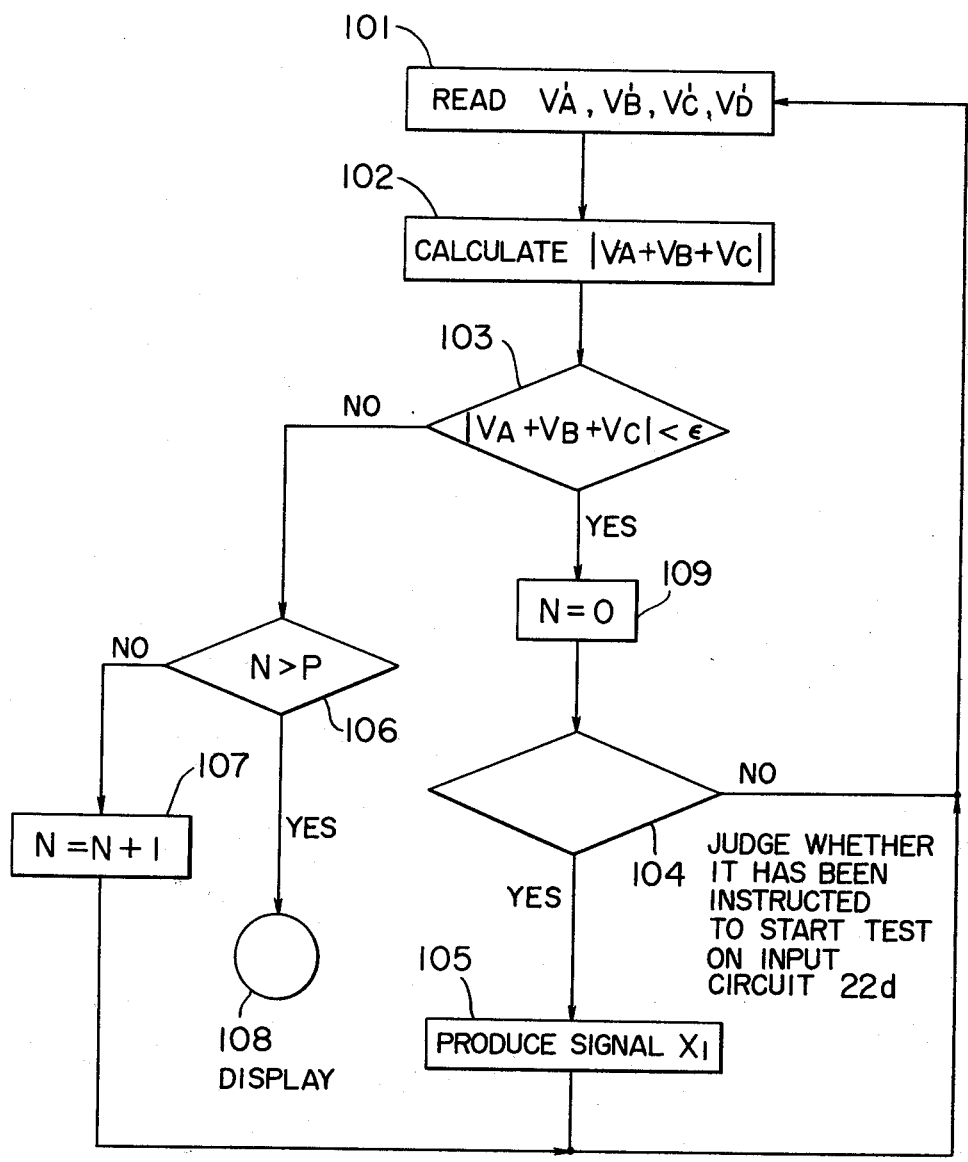
FIG. 5 is a flowchart showing a sequence of operations of the apparatus shown in FIG. 2.

The above described operation is illustrated in the flow chart shown in FIG. 5. At the stage 101, the outputs of the input circuits $22_a$, $22_b$, $22_c$ and $22_d$ are read. Next, at stage 102, the calculation of:

$$|V_A + V_B + V_C|$$

is carried out. Then, the calculated value is compared with $\epsilon$, at stage 103. If the relation (1) is satisfied, the procedure is advanced to the stage 109 (described later) and then to the stage 104, where it is judged whether it has been instructed to start the test on the input crcuit $22_d$, and if the answer is "no", the stage 101 follows. If the answer is "yes" the control signal $X_1$ is produced at stage 105 and test on the input circuit $22_d$ is carried out, as will be described later.

If, at the stage 103, it is judged that the relation (1) is not satisfied, the procedure goes onto the stage 106 where it is examined whether the following relation is satisfied.

$$N > P \qquad (2)$$

where N is a number of consecutive occasions in which the answer of the stage 103 is "no", and P is a preselected critical number. If the relation (2) is not satisfied, one is added to "N" as stored in a memory device of the central processing unit. Then the procedure goes back to the stage 101. If the relation (1) is repeatedly unsatisfied, and, as a result, "N" exceeds "P", the answer of the stage 106 becomes "yes", and it is displayed at stage 108 that there is a fault in the input circuits $22_a$, $22_b$ and $22_c$.

The stage 109 is for resetting the memory storing "N". Thus, once the relation (1) is satisfied during the counting up of "N", "N" is reduced to zero and the counting up of "N" must restart from zero.

As mentioned above, when the answer of the stage 103 is "yes" (i.e., it is confirmed that there is no fault in the input circuits $22_a$, $22_b$ and $22_c$) and if it has been instructed to start test on the input circuit $22_d$ associated with the zero-phase voltage input $V_0$, the control signal $X_1$ becomes "1" (stage 105 in FIG. 5) and the voltage $V_C'$ is fed to the input circuit $15_d$ in place of $V_0'$ which normally equals substantially zero. Accordingly, $V_D'$ becomes equal to $V_C'$. The output of the input circuit $22_d$ is passed through the multiplexer 17, and through the A-D converter 18, to the data processing unit. The data processing unit reads the outputs of the input circuits $22_a$, $22_b$, $22_c$ and $22_d$ (stage 101) and calculates the absolute value of the sum of the outputs of the input circuits $22_a$, $22_b$ and $22_d$ (stage 102). The remaining procedures are similar to those performed when the input circuits $22_a$, $22_b$ and $22_c$ are tested.

Where the result of the test on the outputs of the input circuits $22_a$, $22_b$ and $22_d$ shows that there is a fault and if the result of the test on the outputs of the input circuits $22_a$, $22_b$ and $22_c$ shows that there is no fault, then it is judged that there is a fault in the input circuit $22_d$.

Figure 6:
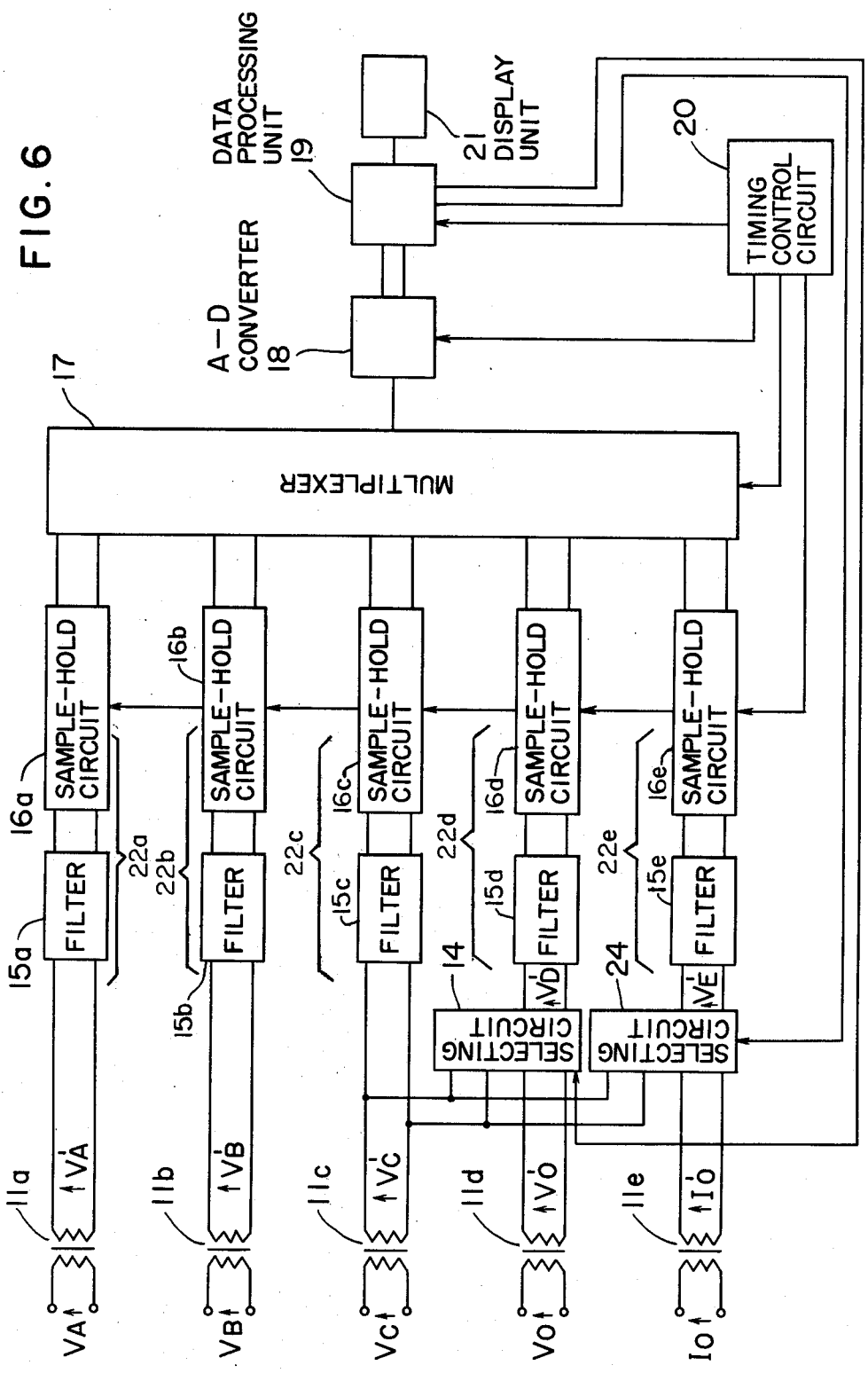

FIG. 6 shows another embodiment of the invention, which is adapted to supervise a protective relaying system having an input circuit $22_e$ for the zero-phase current $I_0$. The input circuit $22_e$ includes a filter $15_e$ similar to the previously mentioned filters $15_a$ through $15_d$ and a sample-hold circuit $16_e$ similar to the sammple-hold circuits $16_a$ through $16_d$. The detected zero-phase current $I_0$ is converted at an input transformer $11_e$ and is fed to a selecting circuit 24 similar to the selecting circuit 14. The selecting circuit 24 selectively connects $I_0'$ or $V_C$ to the output thereof. The multiplexer 17 sequentially sends the outputs of the sample-hold circuits $16_a$ through $16_e$ towards the data processing unit. When checking the input circuit $22_e$, $V_C$ is fed to the input circuit, and the data processing unit 19 performs the operation on the outputs of the input circuits $22_a$, $22_b$ and $22_e$. The rest of the construction and their function are similar to those of the embodiments shown in FIG. 2.

FIG. 7 shows a further embodiment of the invention. In this embodiment, the selecting circuit 14 in FIG. 2 is omitted, and instead, a similar selecting circuit 26 is adapted to receive the outputs of the filters $15_c$ and $15_d$, and the output of the selecting circuit 26 is supplied to the sample-hold circuit $16_d$. In this case, "the input circuit" does not include the filters $15_a$ through $15_d$. When the selecting circuit 26 connects the output of the filter $15_c$ to the input of the sample-hold circuit $16_d$, it is checked whether there is a fault in the sample-hold circuit $16_d$ or not. The rest of the construction and their function are similar to those of the embodiment shown in FIG. 2.

In the foregoing embodiments, $V_C$ is inputted to the input circuit normally associated with the zero-phase input. It should however be noted that $V_A$ or $V_B$ may be used in place of $V_C$. Also, when an input circuit normally associated with the zero-phase current $I_0$ is tested, as in the embodiment of FIG. 4, a signal indicative of a phase current may be introduced to such input circuit.

Figure 8:
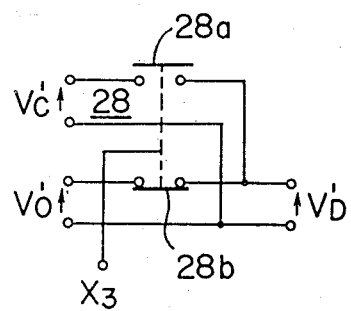
FIG. 8 is a circuit diagram showing another example of the selecting circuit.

The selecting circuits 14, 24 and 26 may comprise any of conventional switching elements such as electronic switches including field effect transistors. They may alternatively comprise a magnetic relay as shown in FIG. 8. The magnetic relay is actuated by a control signal $X_3$ for checking the input circuit associated with the zero-phase voltage $V_0$. Upon receipt of the control signal $X_3$, a normally open contact $28_a$ of the relay 28 is closed and a normally closed contact $28_b$ closed. Thus, selective connection of $V_0'$ or $V_C'$ to the output of the selecting circuit is accomplished.

It has been described that line voltages $V_A$, $V_B$ and $V_C$ are detected and the data processing unit is adapted to perform an operation to find whether the relation (1) is satisfied or not. Instead of the line voltages, phase voltages $V_R$, $V_S$ and $V_T$ may be detected and applied to the data processing unit. In such a case, the data processing unit may be adapted to perform an operation to find whether the following relation (2) is satisfied or not when the input circuits associated with the phase voltages are tested.

$$|V_R+V_S+V_T-KV_0|<\epsilon' \qquad (2)$$

where K and $\epsilon'$ are predetermined constants. To check the input circuit associated with the zero-phase voltage, a relation similar to the relation (1) is employed.

Figure 9:
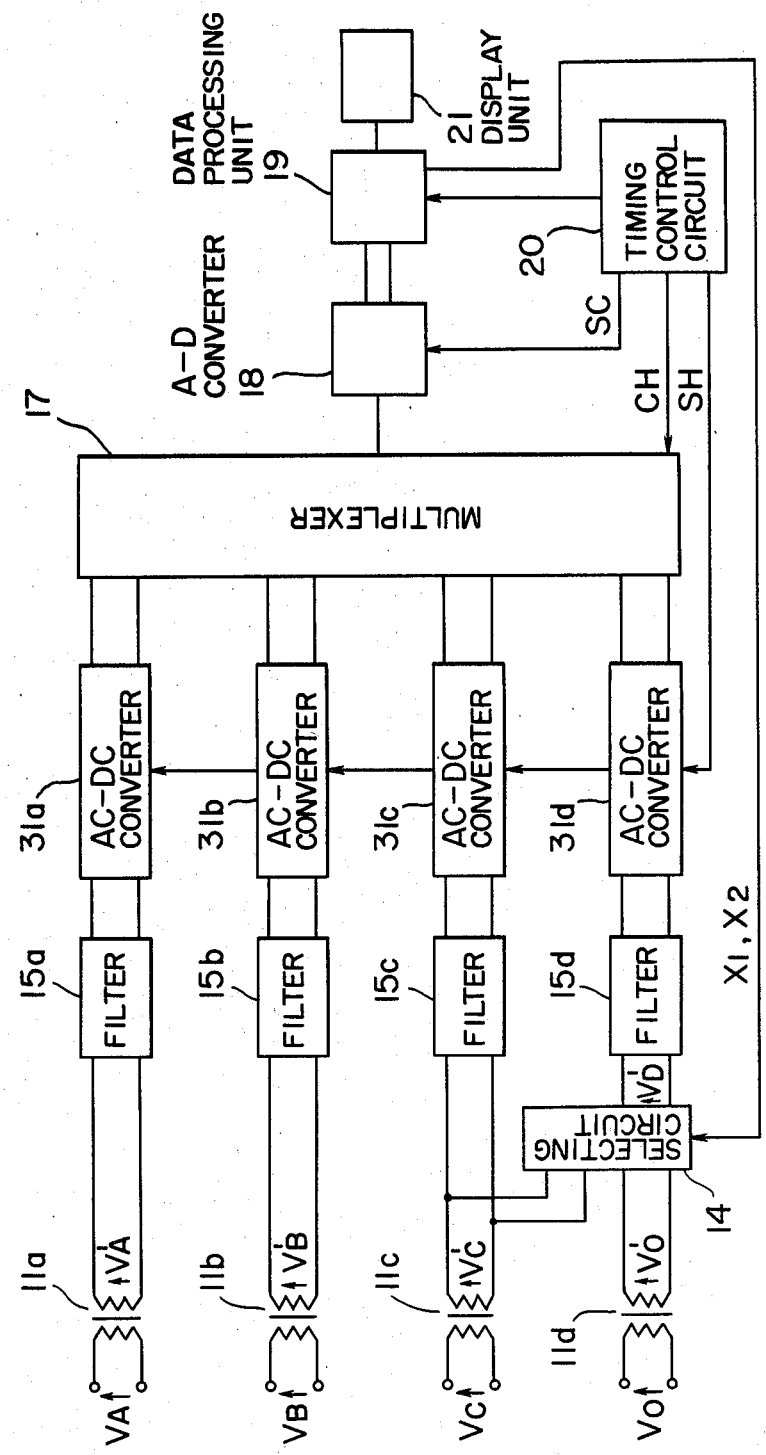
FIG. 9 is a circuit diagram showing a further embodiment of a supervising apparatus according to the invention.

FIG. 9 shows still another embodiment of the invention, which is similar to that shown in FIG. 2, except that the sample-hold circuits $16_a$, $16_b$, $16_c$ and $16_d$ in FIG. 2 are replaced by AC-DC converters $31_a$, $31_b$, $31_c$ and $31_d$. The AC-DC converters convert the inputted AC voltages $V_A'$, $V_B'$, $V_C'$ and $V_D'$ into DC voltages proportional in magnitude to the inputs. The DC outputs of the AC-DC converters are multiplexed at the multiplexer 17 and are fed to the A-D converter 18.

Figure 10:
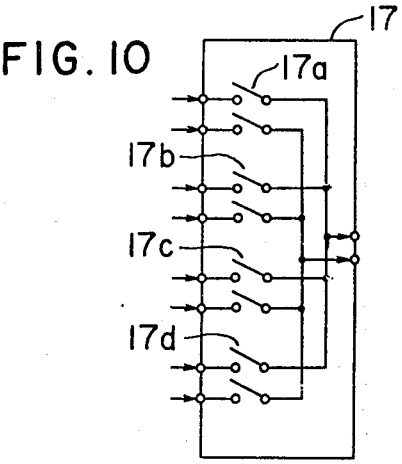
FIG. 10 is a circuit diagram schematically showing an example of the construction of the multiplexer 17.

FIG. 10 schematically illustrates an example of construction of the multiplexer 17, which may be incorporated in the embodiment shown in FIG. 2 and which comprises switching circuits $17_a$, $17_b$, $17_c$ and $17_d$ respectively associated with the detected inputs signals ($V_A'$, $V_B'$, $V_C'$ and $V_0'$). The switching circuits $17_a$, $17_b$, $17_c$ and $17_d$ are closed in turn. The control for the sequential closure is provided by the timing control circuit 20. By the sequential closure of the switching circuits, the outputs of the sample-hold circuits $16_a$, $16_b$, $16_c$ and $16_d$ are sequentially fed to the A-D converter 18. Where there are five detected inputs as in FIG. 6, the multiplexer may comprise five switching circuits.

Where the multiplexer 17 comprises switching circuits respectively associated with the detected inputs, each of the switching circuits may be considered as part of each input circuit which is tested according to the invention.

Figure 11:
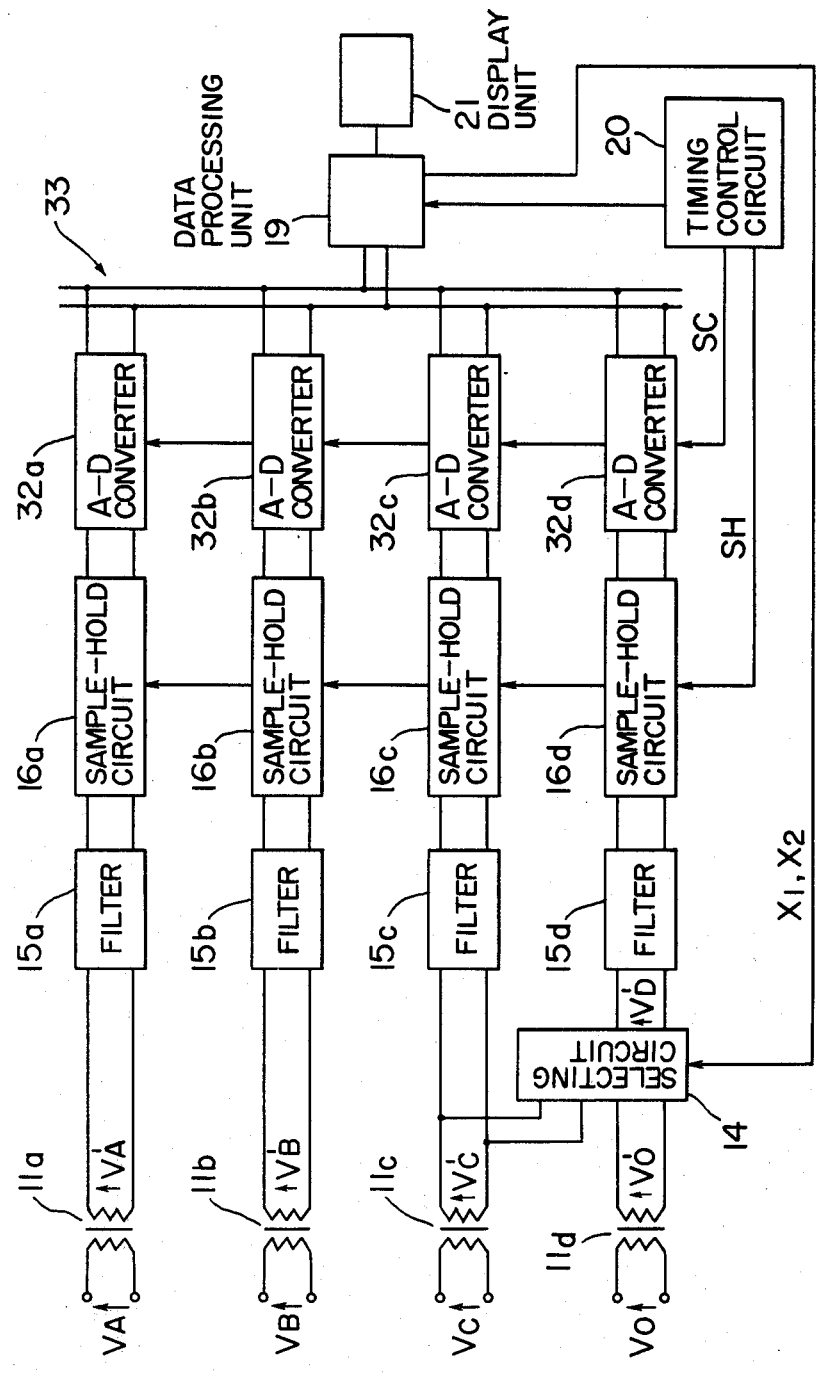
FIG. 11 is a circuit diagram showing a further embodiment of a supervising apparatus according to the invention.

FIG. 11 shows a further embodiment of the invention, which is similar to that shown in FIG. 2, except that the multiplexer 17 and the single A-D converter 18 are omitted, and instead a plurality of A-D converters $32_a$, $32_b$, $32_c$ and $32_d$ are provided in association with the detected inputs. The A-D converters are adapted to receive and digitize outputs of the sample-hold circuits $16_a$, $16_b$, $16_c$ and $16_d$, and the output of the A-D converters are sequentially fed to the data processing unit 19 through a data bus 33. The sequence of sending the outputs of the A-D converters to the data processing unit 19 is controlled by the timing control circuit 20.

Where a plurality of A-D converters are provided and each is provided in association with each detected input, each A-D converter may be considered as part of each input circuit which is tested according to the invention.

The invention is applicable not only where an input circuit associated with the zero-phase voltage or the zero-phase current is tested, but also where an input circuit associated with a value which normally does not exceed a predetermined value is tested.

What is claimed is:

1. In a method for supervising a digital protective relaying system for protecting an electric power system wherein a first type of electrical quantities in the electric power system, each having a certain magnitude, are detected by detecting means and digitized by respective first input circuits and a second type of electrical quantity in the electric power system which is normally substantially zero is detected by detecting means and digitized by a second input circuit, and the outputs of said first input circuits are arithmetically operated on in a data processing unit to check whether there is a fault in the first input circuits, the improvement which comprises: inputting, into the second input circuit, one of said first type of electrical quantities in place of said second type of electrical quantity, and performing an arithmetical operation in the data processing unit on the output of said second input circuit and the outputs of said first input circuits except for that one of said first input circuits which normally receives said one of said first type of electrical quantities to check whether there is a fault in said second input circuit.

2. In an apparatus for supervising a digital protective relaying system for protecting an electric power system wherein a first type of electrical quantities in the electric power system, each having a certain magnitude, are detected by detecting means and digitized by respective ones of first input circuits and a second type of electrical quantity in the electric power system which is normally substantially zero is detected by detecting means and digitized by a second input circuit, and the outputs of said first input circuits are arithmetically operated on in a data processing unit to check whether there is a fault in the first input circuits, the improvement which comprises: selecting means for selectively connecting to said second input circuit said second type of electrical quantity that is normally substantially zero or one of said first type of electrical quantities, and wherein said data processing unit is adapted to perform an arithmetical operation on the output of said second input circuit and the outputs of said first input circuits except that one of said first input circuits which normally receives said one of said first type of electrical quantities to check whether there is a fault in said second input circuit.

3. Apparatus as set forth in claim 2, wherein said electric power system comprises a three-phase system, and said first type of electrical quantities comprises normally symmetrical three-phase quantities.

4. Apparatus as set forth in claim 3, wherein said data processing unit is adapted to calculate the absolute value of the sum of the normally symmetrical three-phase quantities and to judge whether the calculated absolute value is smaller than a predetermined value.

5. Apparatus as set forth in claim 4, wherein said normally symmetrical three-phase quantities comprise line voltages of said electrical power system.

6. Apparatus as set forth in claim 2, wherein each of said first and second input circuits comprises a sample-hold circuit for sampling the input at preselected intervals and holding the sampled data.

7. Apparatus as set forth in claim 2, wherein each of said first and second input circuits comprises an AC-DC converter for converting the AC input to a DC signal having a magnitude proportional to the magnitude of the AC input.

8. Apparatus as set forth in claim 2, wherein each of said first and second input circuits comprises a switching circuit forming part of a multiplexer for sequential transmission of the outputs of said first and second input circuits to said data processing unit.

9. Apparatus as set forth in claim 2, wherein each of said first and second input circuits comprises an analog-to-digital converter for digitizing the input.

10. Apparatus as set forth in claim 6, 7, 8 or 9 wherein each of said first and second input circuits further comprises a filter connected to receive the output of an associated detecting means for supressing harmonics in the output of the associated detecting means.

* * * * *